Patented Apr. 11, 1933

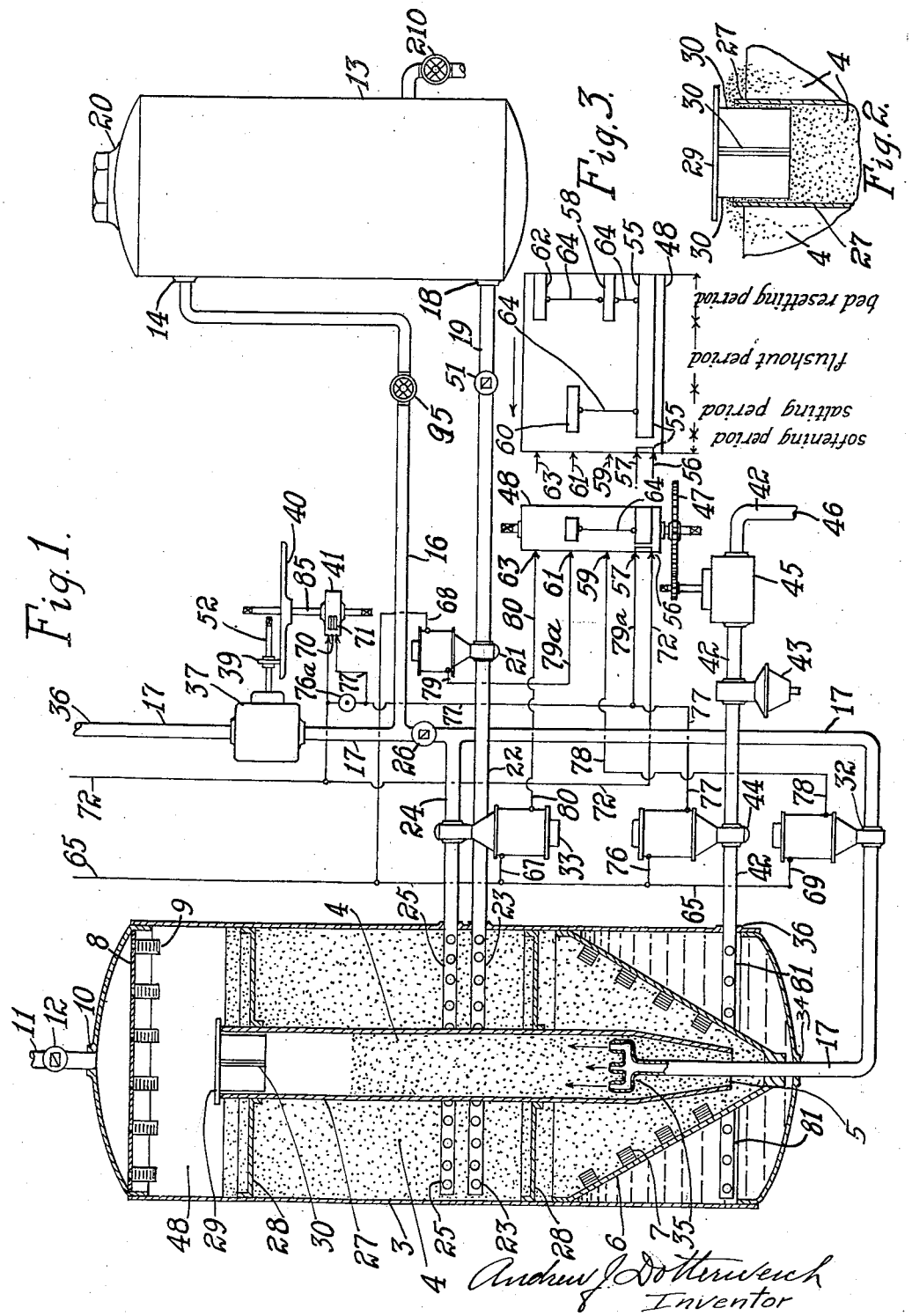

1,903,612

UNITED STATES PATENT OFFICE

ANDREW J. DOTTERWEICH, OF PITTSBURGH, PENNSYLVANIA, ASSIGNOR TO AUTOMATIC WATER SOFTENER COMPANY, OF PITTSBURGH, PENNSYLVANIA, A CORPORATION OF DELAWARE

WATER SOFTENING APPARATUS

Application filed September 25, 1929. Serial No. 395,018.

This invention relates to an improvement in a complete water softening apparatus of the type employing a zeolite or base exchange material as a means to soften water and which is adapted to be regenerated at intervals.

It is among the objects of this invention to provide an apparatus which is capable of delivering softened water continuously from a single container without interruption during periods of regeneration.

Another object of this invention is to provide a process and suitable apparatus for automatically effecting regeneration of the zeolite at intervals without interfering with or interrupting the continuous supply of softened water from the apparatus to a point of use.

Another object of this invention is to divide the bed of zeolite into active and exhausted portions, to retain in the active portion only zeolite having capacity for softening water and to remove the same as they become exhausted to the remaining portion for regeneration by a regenerating solution.

Another object of this invention is to provide a process and apparatus for eliminating unproductive areas in the zeolite bed, which is accomplished by passing each particle of zeolite having capacity for softening water thru the region of greatest softening activity, and when it becomes exhausted removing it for treatment with a regenerating solution, then flushing it free of regenerating solution, after which it is again placed in the region where its restored powers may be utilized.

Another object of this invention is to economize in investment and operation by carrying on simultaneously within a single casing the softening process with delivery of soft water and the regeneration of the exhausted portions of the zeolite bed.

Another object of this invention is to provide a method and means for determining the periods when regeneration is required, as well as for setting in operation the apparatus by means of which such regeneration may be effected.

These and other objects of this invention will become more apparent from consideration of the accompanying drawing in which like characters designate like parts and in which Fig. 1 is a view, partly in section, of a softener unit together with necessary apparatus as embody the principles of this invention; Fig. 2 is a detail drawing of a cap for the inner casing and Fig. 3 is a plan drawing of contacts on the drum operated during the regeneration periods.

For purpose of a better understanding of this invention, several factors affecting the operation must be taken into consideration.

The operation provides for the passing of water from a central inlet or distributor imbedded in the bed of zeolite toward both ends of the container. The passage of the water in an upward direction encounters very little head resistance due to the zeolite bed being in an expanded condition whereas the passage of a fluid in a downward direction encounters considerable resistance to the flow of the fluid tending to compress or pack the bed as is familiar to those skilled in the art. Accordingly a difference in pressure exists in the opposite ends of the container during such periods when a fluid is passing through the zeolite beds, the greater pressure existing in the upper end of the container.

Another factor affecting the efficient operation is the varying pressure within the container due to the various rates at which softened water is passing from the container during the period of regenerating the exhausted bed.

It is quite desirable that the regenerating material and flushout water should pass through the zeolite at certain specific rates of flow to effect complete regeneration and accordingly means must be provided which will control the flow of regenerating material and flushout water passing to the drain to within the preferred specific flow rates independent of the varying pressures within the container. Such means can comprise either a flow regulator or manually operated valve in combination with a pressure gauge which are referred to more specifically in other parts of this specification.

Another factor affecting the operation is the tendency of the regenerating solution and flushout water to pass from the container to the point of use as well as to the drain and accordingly means must be provided to overcome this difficulty. Such means, referred to more specifically in other parts of this specification, provide for a rate of discharge to the drain which must exceed the rate of flow of the diluted regenerating fluid passing into the container during the period of application to the exhausted zeolites and further for a rate of discharge to the drain which must exceed the rate of flow of the flushing water passing into the container during the period of flushing or washing the zeolite subsequent to the application of regenerating material.

Referring to Fig. 1, a container, indicated by the character 3, has within it a bed of water softening material 4 resting on supporting strainer plate 6.

In the upper end of the container 3, a plate 8 equipped with suitable spaced strainer nozzles 9 serves to assist in causing the water to pass uniformly through the zeolite bed towards this plate. The nozzles 9, equipped with a suitable means, further serve to retain within the container such particles of water softening material as may be apt to pass from the container through the connection 10 at the higher rates of flow.

Just below the plate 8 and above the zeolite bed 4, a free-board space 48 of sufficient depth is provided for the resetting of the bed of zeolite as hereinafter referred to.

In the lower end of container 3, provision is made by means of a strainer plate 6 of inverted conical shape to overcome any tendency of the zeolite to pack during the period of rest or while fluid is passing downwardly through it. Strainer nozzles 7, provided with means to retain zeolite within the container, are suitably spaced on the plate 6 and assist in directing the uniform flow of a fluid through the zeolite bed when passing from the container 3 through the connection 36.

During a period of bed resetting, hereinafter referred to, water passing downwardly through the zeolite tends to compress the bed in a manner as will hinder the satisfactory operation of the softener unit. To overcome such a difficulty, while water is passing through strainer nozzles 7, the weight of the zeolite itself plus such water flowing in the direction of the center or apex of the plate causes the zeolite to follow the wall of the conical strainer plate downwardly into the throat at 5 where it is directed upwardly through cylinder 27.

Thru inlet pipes 24 and 22, provision is made whereby separate fluids are introduced into the container 3 to the distributors 25 and 23 respectively positioned in an approximate central location of the zeolite bed as shown.

The tank 13, containing salt for regenerating the softening material, has a water inlet at 14, controlled by valve 95 and is connected by piping 16 to a source of supply from the piping 17. In addition, tank 13 is provided with a concentrated salt solution outlet at 18 having connection by piping 19 through valve 21, choke nozzle 51 and inlet piping 22 with the salt solution distributor 23. The choke 51 provides means for controlling the rate of discharge of a concentrated salt solution from the tank 13 in accordance with the capacity of the zeolite being regenerated.

In the upper end of tank 13, provision is made by means of a removable cap 20 for placing therein enough salt at intervals to serve the requirements of the softener unit for several regenerations.

For purpose of replenishing the salt supply in tank 13, hand valve 95 is closed, valve 210 opened and cap 20 removed. After the tank 13 has drained to the level of valve 210, this valve 210 is closed, the salt charge placed in the tank 13 and valve 95 opened to permit water to fill tank 13. Valve 95 is then closed the cap 20 replaced and then valve 95 reopened.

Incidently, valve 21 is in a normally closed position thus preventing a back flow of water through this valve during the operation of filling the salt tank 13. This above method thus provides a means of replenishing the salt supply without interrupting the supply of softened water.

Leading from a source of water supply at 36, piping 17 has connection with piping 16 leading to the salt tank 13, with raw water inlet connection 24 leading to the distributor 25 and with connection 34 leading to the nozzles 35.

Disposed in the path of the incoming water through piping 17, a choke 26 provides a means whereby during periods of regeneration, a volume of water from the supply pipe 17 is forced into the tank 13 through piping 16 and connection 14, resulting in a discharge of an equal volume of concentrated salt solution from the lower connection 18 of tank 13.

The connection 10 provides an outlet for softened water to pass from the upper end of the container 3 through piping 11 and adjustable choke 12 to a point of use. The setting of the choke 12 provides a means to limit or restrict the flow of water from the softener to within such a rate as is practical for efficient softening.

The connection 36 provides an outlet for fluids to pass from the container 3 through distributor 81, piping 42, flow regulator 43, controlling valve 44 and water meter 45 to a drain 46.

In accordance with an object of this invention, the flow regulator 43 in the drain line 42 provides a means whereby the discharge from the container 3 to the drain is at a predetermined rate of flow regardless of the variations of pressure within the container 3 such as are due to variations in the rate of flow to the point of use.

By proper adjustment of the flow regulator 43, it is quite practical to arrange the rate of discharge from the container 3 to the drain at such a rate of flow which will exceed either the rate of flow of the regenerating fluid or flushout water passing through distributor 23 and downwardly through the lower zeolite bed to prevent the passage of any regenerating material or flushout water to the point of use by the tendency of such fluids to flow in the direction of least resistance, i. e. to the drain.

This tendency of the regeneration fluids to flow to the drain is further assisted by the restricted flow of softened water from the upper end of the container 3 around the loosely fitting cap 29, thence downwardly through the cylinder 27, combining with the fluids passing from the lower zeolite bed, to the drain.

The proper adjustment of the flow regulating valve 43. also provides a means whereby the regenerating material can be applied and flushed out at the proper constant rates of flow for efficient regeneration rather than at irregular and inefficient rates of flow due to variable pressures within the container 3.

The operation of this apparatus requires a provision for revolving or resetting the whole bed upon completion of the regeneration of the exhausted portion in a manner as will remove the newly regenerated portion of the bed from the lower end of this casing by a process of displacement so that on completion of such a revolving process, the newly regenerated bed will be in the upper part of the container 3 and the other portion of the bed in the lower part of the container 3.

Means for accomplishing this revolving action consists of a cylinder 27 suspended centrally, preferably within the container 3 and held in a suitable manner such as by the supporting straps 28.

The upper end of the cylinder 27 preferably extended into the freeboard space, is provided with a loosely fitting cap 29 of such a weight and construction as will permit a restricted passage of softened water around the cap from the upper end of the container thru the cylinder 27 towards the lower end during periods when a fluid is passing from the lower end of the container 3 to the drain. During the bed revolving or resetting operation, a flow of water from the lower end of the container causes the cap to become partially removed from its seat to permit such water to force particles of zeolite from within the cylinder 27 to the upper end of the zeolite bed 4.

Figure 2 illustrates a detail construction of a cap which partially seals the upper end of the cylinder 27 and is equipped with ribs 30 which serve to permit the passage, between the ribs, of water and zeolite to the upper portion of the bed from within the cylinder and then upon completion of the bed resetting operation, the ribs 30 serve to guide the cap 29 to its lowered position in contact with the cylinder 27.

The lower end of the cylinder 27 is located somewhat above the strainer plate 6 a sufficient distance as will permit an easy movement of the zeolite towards this lower opening through the throat 5 for transposition by suction and expansion to the upper end by means of force of the water from the nozzles 35 within the cylinder 27 during the bed resetting operation hereinafter described.

Assuming it is desired to revolve the bed on completion of regenerating the lower zeolite bed, with the drain and water inlet valves still open, the opening of valve 32 permits a flow of water to pass upwardly from nozzles 35 into cylinder 27. The water inlet valve 33 is then closed or partially closed, (as hereinafter referred to) for purpose of removing a head pressure in the upper end of the container 3. The water now passing from nozzles 35 flows at high velocity upwardly through the cylinder 27 carrying with it zeolite from the lower end of the container and depositing it in the upper end. Flowing from the cylinder 27, water passes downwardly through the zeolite, through nozzles 7 and thence from the container 3 through the connection 36. During the process of revolving the bed, the zeolite particles outside of the cylinder 3 are lowered by gravity and the downward flow of water so as to continually feed towards the lower opening of cylinder 27. This bed resetting is continued until all the exhausted zeolites are in the lower end of the container 3 as can be determined by the volume and rate of flow of the water passing from the container.

For purpose of illustration, in Fig. 1, the bed of zeolites shown within the cylinder 27 is with this bed at rest. In Fig. 2, this bed is shown in an expanded condition as during the period of bed resetting.

In accordance with an object of this invention, the water meter 37 together with speed reducing mechanism 39 and 40 and electrical contactor 41 provides a means whereby a separate valve operating mechanism may be set in motion to regenerate the lower or exhausted bed after a predetermined quantity of water has passed into the container 3.

The extended shaft 52 of water meter 37 provides a suitable mount for an adjustably attached friction pinion 39. This friction pinion serves to rotate a disc 40 and drum 41 attached to a common shaft 85 at such relative speeds in accordance with the position of the pinion 39 on the face of the disc 40 to conform with a variable capacity per softening period of the zeolite bed in use, i. e. if the water to be softened is of low hardness, the friction pinion 39 will be positioned on the shaft 52 towards the outer periphery of the disc 40 thus permitting more water to pass through the zeolite bed in use before it is regenerated. If the water to be softened is quite hard, the friction pinion 39 will be positioned closer to the shaft 85 thus permitting less water to pass thru the zeolite bed in use before it is regenerated.

The rotating drum 41 is constructed of an insulated material and has on it a contactor plate 71. This plate 71 serves to close an electrical circuit at contacts 70 with each revolution of the drum for a period of time long enough to permit a separate valve actuating mechanism to remain operative of itself.

In the path of flow from the lower end of the container 3 to the drain at 46, a motor or water meter 45 serves to rotate a drum 48 through a train of gears 47. This drum 48 constructed of insulating material, is provided with inter-connected electrical contact strips 55, 58, 60 and 62 which serve to open and close electrical circuits at 56, 57, 59, 61 and 63 as the drum rotates during the period of regenerating, flushing and resetting the lower bed.

Referring to Fig. 3, this illustrates a plan position of the electrically inter-connected contacts 55, 58, 60 and 62 on the drum 48 which serve to close electrical circuits controlling the operation of various valves during a period of regeneration.

Magnetically operated electrical valves serve to direct the course of flow of fluids through the container in accordance with the making and breaking of electrical circuits by the contacts on drum 48. These valves are of a type which are normally held in one position through the force of gravity or the use of springs and which are shifted to an opposite position by the application of an electrical current to magnetic windings on such valves.

The valves 32, 44 and 21 are of the type as are normally closed and can be fully opened by the application of an electrical current, whereas valve 33 is of the type which is normally open and can be closed or partially closed by the application of an electric current.

Electrical connection is made by one terminal of the magnetic winding on each valve to a source of electrical energy at 65. The other terminal of each valve is brought to one of the contactor fingers 57, 59, 61 and 63 at the drum 48 and thence from there all the circuits are returned through inter-connections 64, contact strip 55 and contact finger 56 by a return connection to source of energy at 72.

The connection of contact fingers 70 with contact plate 71 is in a parallel connection with fingers 56 and 57 for contact plate 55 of the drum 48 in such a manner that after a predetermined volume of water has passed into the container 3, contact is completed at 70, thus completing an electrical circuit, through the windings of valve 44 causing this valve to open and discharge through the meter 45 to the drain.

The flow of water through the meter 45 causes a rotation of the drum 48 which brings the contact fingers 56 and 57 in contact with the plate 55 which holds the electric circuit controlling valves 44 closed until the rotation of the drum 48 interrupts this circuit when the contact plate 55 passes from the fingers 56 and 57 after each bed resetting operation due to the mechanical break in the continuity of contact plate 55.

The flow of water through the meter 45 indirectly causes the breaking of the contact 70 after sufficient water has passed to and from the container 3 as to make the valve actuating mechanism self operating.

Placed in the connection leading to contactor fingers 70, switch 76a provides a manual means for initiating regeneration of the lower zeolite bed by the closing of this switch 76a long enough for the valve actuating mechanism to remain self operative.

The operation of the apparatus is as follows:—

From the source of supply, water passes through piping 17, water meter 37, choke 26, connection 24, valve 33 into container 3 to distributor 25, where the course is by divided paths, the greater volume passing upward through the zeolite bed 4, freeboard space 48, the lesser or almost negligible volume passing downwardly through the regenerated lower zeolite bed 4 into the cylinder 27 through the throat 5, thence upward through the zeolite bed and freeboard space within the cylinder 27, passing around loosely fitting cap 29 and thence into the freeboard space 48 combining with the flow through the other course.

From the freeboard space 48, the water passes from the container 3 through the connection 10, choke 12 to the point of use at 11.

This apparatus provides for an uninterrupted flow of softened water to the point of use and accordingly after a predetermined volume of water has passed from the container in accordance with the capacity of the zeolite bed, the meter 37 causes contact to be made at 70 by means of the contact plate 71. Such contact closes an electric circuit through connections 65, 76, valve 44, connection 77, contacts 70 and connection 72, controlling the valve 44 causing it to open and direct the flow of a fluid from the container 3 through connection 36, piping 42, flow controlling valve 43, valve 44, meter 45 to the drain at 46.

The flow to the drain causes meter 45 to rotate the drum 48 bringing the parallel connected contact fingers 56 and 57 in connection with the contact plate 55, thus providing the means for continuous rotation of the drum until completion of the bed resetting operation. After contact has been made at 56 and 57, the flow of a fluid either to the drain, to a point of use or a combined flow of both causes meter 37 to revolve contact 71 on drum 41 away from contact fingers 70, thus interrupting the initiating circuit at this point. Valve 44 is from then on held open by a completed electric circuit through connections 65, 76, valve 44, connections 77, 79a, contact strip 55 and contact fingers 56 and 57, and connection 72.

The rotation of the drum 48 next causes the salt valve 21 to open due to the making of a contact between contact finger 61 and contact strip 60, thereby completing an electric circuit through connections 65 and 68, valve 21, connection 79, contact finger 61, contact strip 60, connection 64, contact strip 55, contact finger 56, and connection 72.

With valves 33, 21 and 44 in an open position, water from the source of supply at 36 passes through piping 17, water meter 37 and then takes divided paths, one path leading through piping 16, valve 95, connection 14 into the salt tank 13, thence downward forcing a concentrated salt solution from the tank 13 through connection 18, piping 19, choke 51, valve 21 into container 3 through connection 22 and thence from the distributor 23 downwardly through the zeolite bed. The other path of water flow is through choke 26, connection 24, valve 33 into container 3 and thence from the distributor 25 in both upward and downward directions. The downward flow combining with the saturated salt solution from 23 to form a diluted salt solution of the desired concentration and thence downwardly through the lower zeolite bed to the strainer nozzles 7. The upward flow from the distributor 25 is through the upper zeolite bed to the point of use as well as in part around cap 29 into and downwardly through cylinder 27, thence from cylinder 27 through throat 5 where it combines with the salt solution passing through the lower bed. The combined fluids now pass through the strainer nozzles 7 from the container 3 through the connection 36, piping 42, flow control valve 43, valve 44, meter 45 to a drain at 46.

The passage of a predetermined volume of salt solution into the container, determined indirectly by the length of the contact plate 60 and the rate of rotation, causes contact to be broken by the plate 60 passing from the contact finger 61 thereby closing valve 21 and initiating the period of flushing the lower bed free of salt.

The flow of water during the flushout period is from the source of supply thru piping 17, water meter 37, choke 26, connection 24, valve 33 into container 3 to distributor 25.

The flow from the distributor 25 is in divided paths, one path leading downwardly flushing the salt solution from the lower zeolite bed towards strainer nozzles 7, the other path leading upwardly thru the upper zeolite bed to a point of use as well as in part, downwardly thru the cylinder 27. Passing from the cylinder 27 thru the throat 5, this water then combines with the flushing water passing downwardly thru the lower zeolite bed and the combined flow is thru the strainer nozzles 7 from the container 3 thru connection 36, piping 42, flow control valve 43, valve 44, meter 45 to a drain at 46.

The passage of a predetermined volume of flushout water determined by the meter 45 rotating the drum 48 between the salting and bed resetting operation next initiates the period of resetting the bed so that the regenerated portion of the bed is transferred from the lower end of the container to the upper end and the exhausted zeolite bed assumes position in the lower end of the container 3.

The rotation of the drum 48 next causes the contact plate 58 to close a circuit at 59 which opens the bed resetting valve 32 and in addition causes contact plate 62 to complete a circuit at 63 closing valve 33 controlling a flow of water to the distributor 25. The circuit maintaining valve 32 open is through connections 65 and 69, valve 32, connection 78, contact finger 59, contact strip 58, connection 64, contact strip 55, contact finger 56, and connection 72. The circuit maintaining valve 33 closed is through connections 65 and 67, valve 33, connection 80, contact finger 63, contact strip 62, connection 64, passing through contact strip 58, contact strip 55, contact finger 56 and connection 72.

With valves 33 and 21 closed and valves 32 and 44 open, the flow of water is from the source at 36 thru piping 17, water meter 37, valve 32, connection 34 into container 3 and thence thru nozzles 35 upwardly into cylinder 27 carrying with it zeolite in a manner described partially lifting the cap 29 from its seat on cylinder 27 as the water and zeolite pass from the cylinder 27, thence taking a divided path, one path leading thru the connection 10 to the point of use, the other path leading downwardly thru the zeolite beds, towards the strainer nozzles 7, thence in part passing from the container 3 thru the connection 36, piping 42, flow controlling valve 43, valve 44, water meter 45, to a drain at 46 and in part passing into the cylinder 27 at 5 to be redirected in a churning fashion. The passing of contact strips 62 and 58 from contact fingers 63 and 59 respectively, interrupts the respective circuits controlled by them, thereby causing valve 33 to open and valve 32 to close, thus terminating the bed resetting operation. The flow to the drain continues until a predetermined volume of water has passed to the drain and contact plate 55 moves from the contact fingers 56 and 57, breaking the electrical circuit controlling the valve 44 and thus terminating the flow to the drain and completing the cycle of salting, flushing and bed resetting operations.

Certain zeolites are quite well adapted to soften water at high rates of flow such as is the case when water to be softened is passing only thru the cylinder 27 to the point of use as well as to the drain.

In the instance where slower acting zeolites are employed as a water softening medium, the valve 33 can be so constructed as to partially close and permit a restricted flow of water to pass into the container 3 to the distributor during the period of bed resetting. The volume of water as can pass into the container 3 to the distributor 25 must not exceed such a rate of flow as will hinder the bed resetting operation by the building up of a head pressure in the upper end of the container which cannot be overcome by the flow of water passing thru the cylinder in the process of transposing the zeolite bed, that is, the upward pressure in the cylinder 27, due to the force of flow, must exceed the pressure in the upper end of the container so that the cap 29 can be removed from its seat in the process of resetting the bed.

This plan of resetting the bed provides for a flow of water from the source of supply at 36 thru piping 17, water meter 37, choke 26 then by divided paths into the container 3, one path leading thru connection 24 partially closed valve 33 to the distributor 25. From the distributor 25, during a period when softened water is flowing from the container 3 thru connection 10, the flow is in part upward thru the gradually lowering zeolite towards the freeboard space, the other flow in part from the distributor 25 is downward thru the lowering zeolite bed, strainer nozzles 7, and thence from the container 3 thru the connection 36, piping 42, flow control valve 43, drain valve 44, water meter 45 to the drain at 46. The other path of flow leading to the container is thru valve 32, connection 34 to the nozzles 35, thence upwardly thru the zeolite cylinder 27, transposing the zeolite in a manner as heretofore described lifting the cap 29 from its seat, thence combining with the water passing upwardly the distributor 25 from whence the combined flow is thru the freeboard space 48, strainer nozzles 9, connection 10, choke 12 to a point of use at 11.

During periods when no water is passing to the point of use, the flow in part is upward thru the cylinder 27, thence downwardly thru the upper portion of the zeolite bed where it combines with the restricted flow of water passing into the container 3 thru the distributor 25, thence the entire flow of all water is in part downward towards the strainer nozzles to the drain and in part towards the cylinder 27 to be lifted therein with the zeolite.

It is perhaps quite obvious to those skilled in the art that an electric motor can be substituted for the water meter 45 rendering the apparatus operative wherein the periods of salting, flushing and bed resetting can be effected in predetermined lengths of time in accordance with the lengths of the contact plates and rotation of the drum 48 rather than on a volumetric basis and accordingly I desire to comprehend such valve controlling apparatus as being within the scope of this invention.

By describing and illustrating herein what I consider to be the preferred embodiment of apparatus suitable for practicing the invention, I do not thereby suggest or intend that the invention is limited in its application, or that the solicited claims are to be narrowed in their interpretation to any details not specifically referred to therein, for it is reasonably expected that those skilled in the art will be able to take advantage of the principles involved in the disclosure by apparatus, use and methods of procedure perhaps dissimilar in appearance and arrangement but nevertheless within the scope of the invention and I therefore desire to comprehend within my invention such modifications as may be necessary to adapt it to varying conditions and uses.

I claim:

1. A water softener comprising a container for a bed of water-softening material, means for introducing water into the bed between its upper and lower parts, an outlet pipe in connection with the upper part of the container, valve-controlled means for introducing regenerating material into the bed between its upper and lower parts and below the point where the water is introduced, a valve-controlled drain pipe in connection with the lower part of the container, a transfer tube establishing communication between the lower portion of the bed and the upper part of the container, valve-controlled means for directing a stream of water up through said tube for a bed-rearranging operation, and means for shutting off the supply of water to the first mentioned means during such bed-rearranging operation.

2. In a water softener of the character described having a transfer tube and means for flowing water upwardly therethrough for a bed-rearranging operation, a dished strainer plate enclosing the lower portion of the tube and supporting the adjacent portion of the bed and providing steep slanting walls to facilitate gravitation of the granular material of said bed to the lower end of the tube, the softener having a drain outlet connection in communication therewith below the strainer plate.

In testimony whereof I have hereunto set my hand this 22d day of August, 1929, at Pittsburgh, Pa.

ANDREW J. DOTTERWEICH.